United States Patent [19]

Kawashima et al.

[11] Patent Number: 5,204,236
[45] Date of Patent: Apr. 20, 1993

[54] SILVER HALIDE PHOTOGRAPHIC MATERIALS

[75] Inventors: Yasuhiko Kawashima; Reiko Yamauchi, both of Hino, Japan

[73] Assignee: Konica Corporation, Tokyo, Japan

[21] Appl. No.: 842,481

[22] Filed: Feb. 27, 1992

[30] Foreign Application Priority Data

Mar. 26, 1991 [JP] Japan .................................. 3-61931

[51] Int. Cl.$^5$ ............................................. G03C 1/825
[52] U.S. Cl. .................................. 430/579; 430/513; 430/517; 430/522; 544/82; 546/256; 546/187; 548/183; 548/365.4
[58] Field of Search .............. 430/579, 512, 522, 513, 430/595, 583, 584; 548/364, 183; 546/256, 187; 544/82

[56] References Cited

U.S. PATENT DOCUMENTS 3,247,127 4/1966 Bailey et al. ...................... 430/518
4,440,852 4/1984 Onishi et al. ...................... 430/522
4,960,686 10/1990 Kawashima et al. .............. 430/522

Primary Examiner—Charles L. Bowers, Jr.
Assistant Examiner—Thorl Chea
Attorney, Agent, or Firm—Finnegan, Henderson, Farabow, Garrett & Dunner

[57] ABSTRACT

The improved silver halide photographic material is provided which contains a compound of the general formula (I):

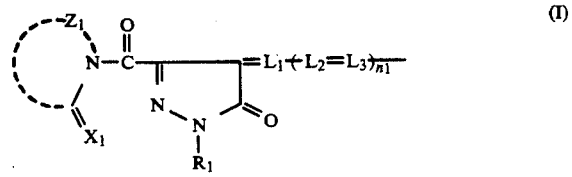
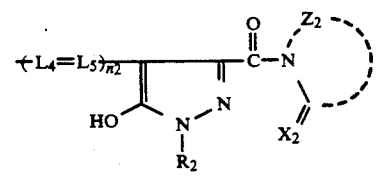

wherein $R_1$ and $R_2$ each represents a hydrogen atom, an alkyl group, an aryl group, an alkenyl group or a heterocyclic group; $Z_1$ and $Z_2$ each represents a non-metallic atomic group necessary for forming a 5- to 7-membered ring; $X_1$ and $X_2$ each represents an oxygen atom, a sulfur atom or $=N-R_3$; $R_3$ is a hydrogen atom, an alkyl group, an aryl group, an alkenyl group, a heterocyclic group or $-OR_4$; $R_4$ represents a hydrogen atom, an alkyl group, an aryl group, an alkenyl group or a heterocyclic group; $L_1$ to $L_5$ each represents a methine group; and $n_1$ and $n_2$ each represents an integer of 0, 1 or 2.

3 Claims, No Drawings

SILVER HALIDE PHOTOGRAPHIC MATERIALS

BACKGROUND OF THE INVENTION

This invention relates to a silver halide photographic material containing a dye, more particularly, to a silver halide photographic material containing hydrophilic colloidal layer tinted with a dye useful as a light-absorbent.

Incorporation of dyes in a silver halide photographic material in order to absorb specific wavelength of light for purposes of filtering, anti-halation, anti-irradiation and sensitivity adjustment is a well-known practice and in such photographic materials hydrophilic colloidal layers are tinted with the incorporated dye.

A filter layer is usually positioned either on the top or between the light-sensitive emulsion layers to ensure that the incident light reaching each emulsion layer will have a preferred spectral composition. Further, in order to improve the sharpness of the photographic image, an anti-halo layer is provided between an emulsion layer and a support or at the back of the support so as to absorb any deleterious light that is reflected at the interface between the emulsion layer and the support or from the back side of the support. Another common practice is to tint emulsion layers so that any deleterious light reflected or scattered by silver halide grains will be absorbed to prevent irradiation.

The dyes used for attaining these purposes must satisfy various requirements, among which the followings are particularly important: that they should have satisfactory absorption spectral characteristics depending on a specific object of use; that they should be completely decolored during photographic processing and should easily dissolve out of the silver halide photographic material, resulting in no color remnant or staining by the dye after photographic processing; that they should not cause fogging, desensitization or any other adverse effects on photographic emulsions; and that they should not change in color or fade with good aging stability in solution or silver halide photographic materials.

In order to discover a dye which satisfies all of these requirements, a considerable amount of studies have been made, to provide a number of dyes, among which are the oxonole dyes described in U.S. Pat. No. 3,247,127, Examined Japanese Patent Publication Nos. 22069/1964 and 10059/1980, etc. However, there could be obtained no dye which satisfies all of the aforementioned requirements and which has good characteristics enough to be used in photographic materials.

Oxonole dyes having a carbamoyl group in 3-position are described in British Patent No. 1,338,799, Unexamined Published Japanese Patent Application Nos. 77327/1976, 143342/1983, 111641/1984, 139944/1988, etc. Those dyes described in British Patent No. 1,338,799 and Unexamined Published Japanese Patent Application No. 77327/1976 have no water-soluble group in their structure, and therefore they are insoluble or only sparingly soluble in water.

However, photographic processing is usually conducted within a short period of time under low-alkaline conditions and, hence, it is difficult for these dyes to completely dissolve out of the photographic materials. In addition, dyes which have once been decolored might be recolored afterwards or, even if they are not recolored, they might cause photographically adverse effects. Therefore, if dyes are to be used in photographic materials of a multi-layered coating structure in order to achieve the above mentioned objects, it is desirable to render these dyes water-soluble by introducing water-soluble groups. Such water-soluble dyes will readily dissolve out during photographic processing and will never remain in the photographic material.

The water-soluble dyes are advantageous in that they can be incorporated into photographic materials as an aqueous solution. On the contrary, sparingly soluble dyes require the use of an organic solvent, which can be a potential cause of pollution.

Unexamined Published Japanese Patent Application Nos. 143342/1983, 111641/1984, 139944/1988 and 126646/1989 disclose oxonole dyes having a carbamoyl group in 3-position at which a water-soluble group is attached; however, their properties, especially the bleaching performance, is unsatisfactory and further improvements have been needed.

Unexamined Published Japanese Patent Application No. 93534/1990 discloses a dye having a hetero ring at the 3,3'-position of a pyrazolonering; however, the hetero rings disclosed therein are only morpholine, piperazine and piperidine, and quite different from heterocyclic rings contemplated in the present invention. Furthermore, the compounds disclosed in this reference are unsatisfactory in performance such as bleaching performance, etc.

SUMMARY OF THE INVENTION

Under these circumstances, the present inventors conducted intensive studies in order to eliminate the aforementioned defects of the conventional dyes and to develop dyes which satisfy all requirements needed for light-absorbing dyes. As a result, the present inventors have found that light-absorbing dyes having a carbamoyl group forming a heterocyclic ring are particularly advantageous not only in decoloring and dissolving properties but also in their photographically inertness. The present invention has been accomplished on the basis of these findings.

An objects, therefore, of the present invention is to provide a silver halide photographic material which comprises a water-soluble dye which is photographically inert in said photographic material and readily decolored and/or dissolved out during photographic processing, to leave almost no stain after processing.

This object of the present invention can be attained by a silver halide photographic material which comprises containing a compound of the general formula (I):

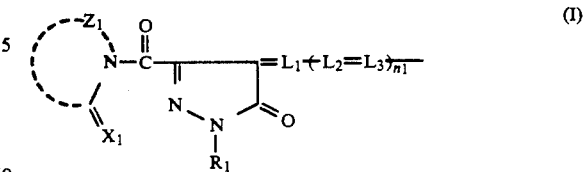

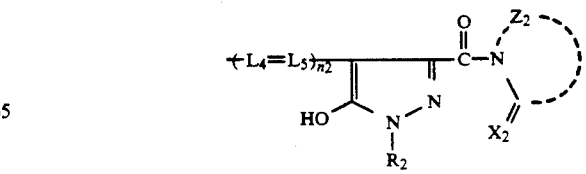

wherein $R_1$ and $R_2$ each represents a hydrogen atom, an alkyl group, an aryl group, an alkenyl group or a heterocyclic group; $Z_1$ and $Z_2$ each represents a non-metallic atomic group necessary for forming a 5- to 7-membered ring; $X_1$ and $X_2$ each represents an oxygen atom, a sulfur atom or $=$N-$R_3$; $R_3$ is a hydrogen atom, an alkyl group, an aryl group, an alkenyl group, a heterocyclic group or —O$R_4$; $R_4$ represents a hydrogen atom, an alkyl group, an aryl group, an alkenyl group or a heterocyclic group; $L_1$ to $L_5$ each represents a methine group; and $n_1$ and $n_2$ each represents an integer of 0, 1 or 2.

DETAILED DESCRIPTION OF THE INVENTION

The oxonole dyes used in the present invention are represented by the general formula (I). The groups represented by $R_1$ and $R_2$ in this formula also include those having substituent(s). Specific examples of $R_1$ and $R_2$ are listed below.

Examples of the alkyl group represented by $R_1$ and $R_2$ are methyl, ethyl, propyl, isopropyl, n-butyl, t-butyl, cyclopentyl, cyclohexyl, etc. These alkyl groups may contain, as a substituent, a hydroxyl group, a cyano group, a sulfo group, a carboxyl group, a halogen atom (e.g. fluorine, chlorine and bromine), an alkoxy group (e.g. methoxy and ethoxy), an aryloxy group (e.g. phenoxy, 4-sulfophenoxy and 2,4-disulfophenoxy), an aryl group (e.g. phenyl, 4-sulfophenyl and 2,5-disulfophenyl), an alkoxycarbonyl group (e.g. methoxycarbonyl and ethoxycarbonyl), an aryloxycarbonyl group (e.g. phenoxycarbonyl), a carbamoyl group (e.g. phenylcarbamoyl and ethylcarbamoyl), an amido group (e.g. anilinocarbonyl and methylaminocarbonyl), a sulfamoyl group (e.g. methylaminosulfonyl and anilinosulfonyl), a sulfonylamino group (e.g. methylsulfonylamino and benzenesulfonylamino), etc.

Examples of the alkenyl group represented by $R_1$ and $R_2$ are vinyl, allyl, etc. These alkenyl groups may additionally have substituent(s) which may be the same alkyl group(s) or substituent(s) as listed in the description of the alkyl group and its substituents.

Examples of the aryl group represented by $R_1$ and $R_2$ include phenyl, naphthyl, etc. These aryl groups may have similar alkyl group(s) or substituent(s) as those listed in the description of the alkyl group and its substituents.

Examples of the heterocyclic group represented by $R_1$ and $R_2$ include pyridyl, oxazolyl, thiazolyl, imidazolyl, furyl, pyrrolyl, thienyl, pyrazinyl, pyrimidinyl, pyridazinyl, purinyl, isoxazolyl, selenazolyl, sulfolanyl, piperidinyl, pyrazolyl, tetrazolyl, etc. These heterocyclic groups may additionally include similar alkyl group(s) or substituents as those listed in the description of the alkyl group and its substituents.

In the general formula (I), $X_1$ and $X_2$ each represents an oxygen atom, a sulfur atom or $=$N-$R_3$, where $R_3$ is a hydrogen atom, an alkyl group, an aryl group, an alkenyl group, a heterocyclic group or —O$R_4$, and $R_4$ is a hydrogen atom, an alkyl group, an aryl group, an alkenyl group or a heterocyclic group. The alkyl, aryl, alkenyl and heterocyclic groups represented by $R_3$ and $R_4$ have the same meanings as defined in $R_1$ and $R_2$.

Examples of the 5- to 7-membered ring containing $Z_1$ or $Z_2$, in the general formula (I), include pyridone, pyrazolone, quinolone, isoquinolone, pyrrolidone, piperidone, thiazolidone, thiazolinethio, thiohydantoin, rhodanine, dithiohydantoin, etc. and derivatives thereof. These rings may additionally contain similar alkyl group(s) or substituents(s) as those listed in the above description of the alkyl group and its substituents in $R_1$ and $R_2$.

The methine group represented by $L_1$ to $L_5$ in the general formula (I) may have a substituents such as an alkyl group (e.g. methyl, ethyl, i-propyl, t-butyl, 3-hydroxypropyl and benzyl), an aryl group (e.g. phenyl), a halogen atom (e.g. chlorine, bromine, iodine and fluorine), an alkoxy group (e.g. methoxy and ethoxy), an acyloxy group (e.g. methylcarbonyloxy and phenylcarbonyloxy), etc.

Preferably, $R_1$ and $R_2$ each represents an alkyl group or a substituted phenyl group, and the 5- to 7-membered hetero ring containing $Z_1$ or $Z_2$ is pyrrole, imidazole, pyrazole or triazole. In a particularly preferred embodiment, $R_1$ and $R_2$ each represents a substituted phenyl group, and $X_1$ and $X_2$ each represents an oxygen atom.

Concrete examples of the dyes represented by the general formula (I) of the present invention (some of them are referred to as "exemplary compounds" in Examples 1 and 2 below) are shown below which should never be construed as limiting the invention.

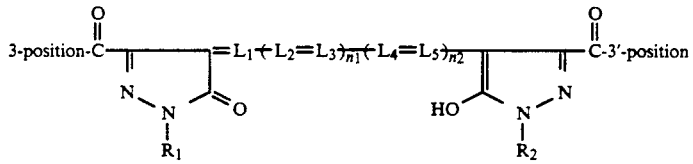

60

65

| No. | 3-position | 3'-position | R₁ | R₂ | L₁ | L₂ | L₃ | L₄ | L₅ | n₁ | n₂ |
|---|---|---|---|---|---|---|---|---|---|---|---|
| 1 | succinimide | succinimide | C₆H₄-SO₃K (para) | C₆H₄-SO₃K (para) | =CH— | — | — | —CH= | =CH— | 0 | 1 |
| 2 | 2-pyrrolidinone | 2-pyrrolidinone | C₆H₃(SO₃Na)(CH₃)-SO₃Na | C₆H₃(SO₃Na)(CH₃)-SO₃Na | =CH— | —CH= | =CH— | —CH= | =CH— | 1 | 1 |
| 3 | 2-pyridone | 2-pyridone | C₆H₃(SO₃K)(CH₃)-SO₃K | C₆H₃(SO₃K)(CH₃)-SO₃K | =CH— | — | — | — | — | 0 | 0 |
| 4 | 2-pyridone | 2-pyridone | C₆H₃(SO₃K)(CH₃)-SO₃K | C₆H₃(SO₃K)(CH₃)-SO₃K | =CH— | —CH= | =CH— | —CH= | =CH— | 1 | 1 |
| 5 | 6-chloro-2-pyridone | 6-chloro-2-pyridone | C₆H₃(SO₃Na)(CH₃)-SO₃Na | C₆H₃(SO₃Na)(CH₃)-SO₃Na | =CH— | —CH= | =CH— | — | — | 1 | 0 |
| 6 | 6-methyl-2-pyridone | 6-methyl-2-pyridone | C₆H₄-SO₃K (para) | C₆H₄-SO₃K (para) | =CH— | —CH= | =CH— | —CH= | =CH— | 1 | 1 |

| No. | 3-position | 3'-position | R₁ | R₂ | L₁ | L₂ | L₃ | L₄ | L₅ | n1 | n2 |
|---|---|---|---|---|---|---|---|---|---|---|---|
| 7 | 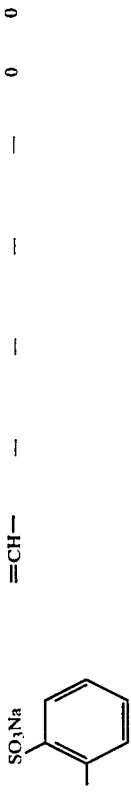 |  | 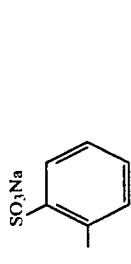 o-SO₃Na |  o-SO₃Na | =CH— | — | — | — | — | 0 | 0 |
| 8 | 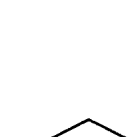 4-SO₃K |  4-SO₃K | —CH₃ | —CH₃ | =CH— | —CH= | =CH— | —CH= | =CH— | 1 | 1 |
| 9 | 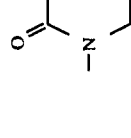 | 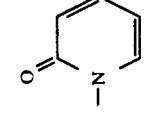 | 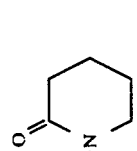 3,5-(SO₃K)₂ | 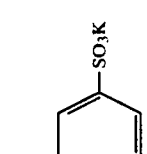 3,5-(SO₃K)₂ | =CH— | —CH= | =CH— | — | — | 1 | 0 |
| 10 | 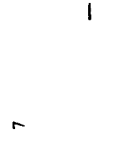 | 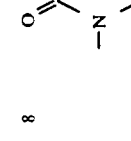 | 2,5-(SO₃Na)₂ phenyl | 2,5-(SO₃Na)₂ phenyl | =CH— | —CH= | =CH— | —CH= | =CH— | 1 | 1 |
| 11 | 2,6-dioxo pyridine | 2,6-dioxo pyridine | 2,4-(SO₃Na)₂ phenyl | 2,4-(SO₃Na)₂ phenyl | =CH— | —CH= | =CH— | —CH= | =CH— | 1 | 1 |
| 12 | 4-CH₃ pyridone | 4-CH₃ pyridone | m-SO₃K phenyl | m-SO₃Na phenyl | =CH— | —CH= | =CH— | — | — | 1 | 0 |

-continued

| No. | 3-position | 3'-position | R₁ | R₂ | L₁ | L₂ | L₃ | L₄ | L₅ | n₁ | n₂ |
|---|---|---|---|---|---|---|---|---|---|---|---|
| 13 | 3-methoxy pyridone | 3'-methoxy pyridone | 2-methyl-1,4-benzenedisulfonate dipotassium | 2-methyl-1,4-benzenedisulfonate dipotassium | =CH– | –CH= | =CH– | –CH= | =CH– | 1 | 1 |
| 14 | 3,5-dichloro pyridone | 3',5'-dichloro pyridone | 5-methyl-1,3-benzenedisulfonate dipotassium | 5-methyl-1,3-benzenedisulfonate dipotassium | =CH– | –CH= | =CH– | –CH= | =CH– | 1 | 1 |
| 15 | 3,5-diphenyl pyridone | 3',5'-diphenyl pyridone | 2-methyl-1,4-benzenedisulfonate dipotassium | 2-methyl-1,4-benzenedisulfonate dipotassium | =CH– | –CH= | =CH– | — | — | 1 | 0 |
| 16 | pyridone | pyridone | 2-methyl-1,4-benzenedisulfonate disodium | 2-methyl-1,4-benzenedisulfonate disodium | =CH– | –CH= | $-\overset{CH_3}{\underset{|}{C}}-$ | –CH= | =CH– | 1 | 1 |
| 17 | pyridone | pyridone | 4-sulfonate sodium phenyl | 4-sulfonate sodium phenyl | =CH– | phenyl-C= | =CH– | — | — | 1 | 0 |

| No. | 3-position | 3'-position | R₁ | R₂ | L₁ | L₂ | L₃ | L₄ | L₅ | n₁ | n₂ |
|---|---|---|---|---|---|---|---|---|---|---|---|
| 18 | morpholinone | morpholinone | 2,5-di(SO₃K)phenyl | 2,5-di(SO₃K)phenyl | =CH— | —CH= | $\overset{Cl}{=\!C\!-}$ | —CH= | =CH— | 1 | 1 |
| 19 | 4,4-dimethyl-pyrazolone | 4,4-dimethyl-pyrazolone | 2-SO₃Na-phenyl | 2-SO₃Na-phenyl | =CH— | —CH= | =CH— | — | — | 1 | 0 |
| 20 | rhodanine(CH₃, OH) | rhodanine(CH₃, OH) | 4-CH₂SO₃K-phenyl | 4-CH₂SO₃K-phenyl | =CH— | —CH= | =CH— | — | — | 1 | 0 |
| 21 | 4-SO₃K-pyridone | 4-SO₃K-pyridone | 2-pyridyl | 2-pyridyl | =CH— | —CH= | =CH— | — | — | 1 | 0 |
| 22 | pyridone | pyridone | 2-methyl-6-SO₃K-benzothiazolyl | 2-methyl-6-SO₃K-benzothiazolyl | =CH— | —CH= | =CH— | —CH= | =CH— | 1 | 1 |
| 23 | SO₃K-phthalimide | SO₃K-phthalimide | —CH₃ | —CH₃ | =CH— | —CH= | =CH— | —CH= | =CH— | 1 | 1 |

-continued

| No. | 3-position | 3'-position | R₁ | R₂ | L₁ | L₂ | L₃ | L₄ | L₅ | n₁ | n₂ |
|---|---|---|---|---|---|---|---|---|---|---|---|
| 24 | isoindolin-1-one-2-yl with NaO₃S | isoindolin-1-one-2-yl with NaO₃S | cyclopentyl (H) | cyclopentyl (H) | =CH— | —CH= | =CH— | — | — | 1 | 0 |
| 25 | N-OH isoindolin-2-yl | N-OH isoindolin-2-yl | o-SO₃K-phenyl | o-SO₃K-phenyl | =CH— | —CH= | =CH— | — | — | 1 | 0 |
| 26 | thiazolidine-2-thione-3-yl | thiazolidine-2-thione-3-yl | p-SO₃Na-phenyl | p-SO₃Na-phenyl | =CH— | —CH= | =CH— | — | — | 1 | 0 |
| 27 | thiazoline-2-thione-3-yl | thiazoline-2-thione-3-yl | 2,4-(SO₃K)₂-phenyl | 2,4-(SO₃K)₂-phenyl | =CH— | —CH= | =CH— | —CH= | =CH— | 1 | 1 |
| 28 | isoindolin-1-one-2-yl with KO₃S | isoindolin-1-one-2-yl with KO₃S | —CH=CH₂ | —CH=CH₂ | =CH— | — | — | — | — | 0 | 0 |

| No. | 3-position | 3'-position | $R_1$ | $R_2$ | $L_1$ | $L_2$ | $L_3$ | $L_4$ | $L_5$ | $n_1$ | $n_2$ |
|---|---|---|---|---|---|---|---|---|---|---|---|
| No. 29 | | | | | | | | | | | |
| No. 30 | | | | | | | | | | | |

The synthesis of exemplary compound No. 4 is shown below. Other compounds can also be synthesized similarly.

The oxonole dyes used in the present invention can be readily synthesized in accordance with the method described in Unexamined Published Japanese Patent Application No. 143342/1983.

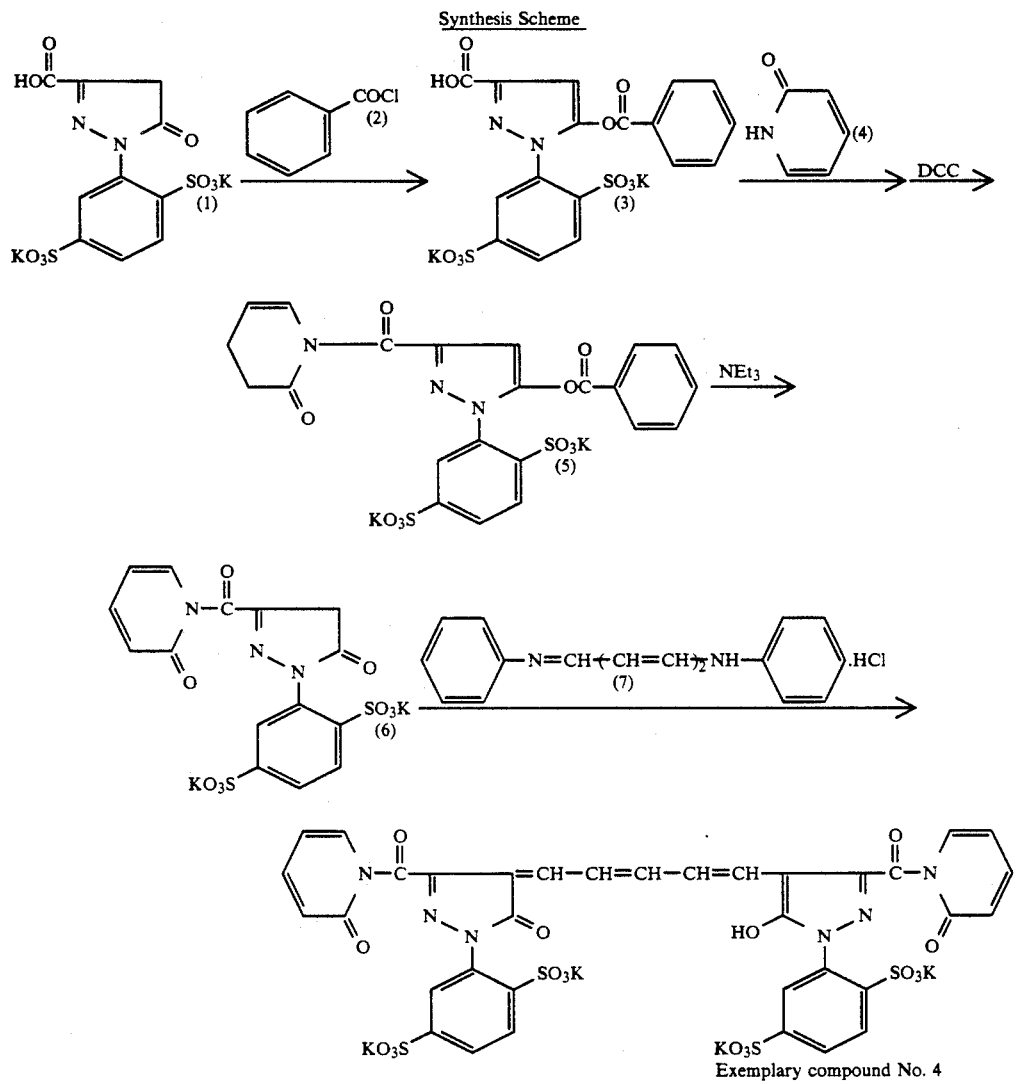

Exemplary compound No. 4

Synthesis of Compound (3) (protection reaction)

A 300-ml conical flask is charged with 44 g of Compound (1), 100 ml of dimethylformamide (DMF) and 100 ml of water to form a uniform solution. While stirring, 11 g of triethylamine is added at once at room temperature and then, 14.5 g of benzoyl chloride is slowly added dropwise. The resulting mixture is stirred at room temperature for 3 h, then 1500 ml of acetone is added to afford crystals. Subsequent filtration and drying gives the title compound.

Yield: 34 g (63%)

Synthesis of Compound (5) (condensation reaction)

Compound (3) (54.5 g), Compound (4) (9.5 g), DMF (150 ml) and pyridine (13.8 g) are mixed and to the mixture, 21 g of dicyclohexyl carbodiimide (DCC) is added portionweise at room temperature. After the addition, the mixture is stirred at room temperature for 5 h and the precipitate formed is filtered. Acetone (800 ml) is added to the filtrate to afford crystals. The crystals are recovered by filtration and dried to give the title compound. Yield: 43 g (69%)

Synthesis of Compound (6) (deprotection reaction)

Methanol (200 ml) is added to 62.1 g Compound (5) and, to the mixture, 30 g of triethylamine is added immediately. After the addition, the mixture is stirred at room temperature for 1 h and methanol is distilled off under reduced pressure. Acetone (200 ml) is added to the residue and the resulting suspension is stirred and filtered to give the title compound. Yield: 51 g (98%)

Synthesis of exemplary compound No. 4 (dye forming reaction)

Compound (6) (5.2 g), Compound (7) (1.4 g), DMF (25 ml) and NEt$_3$ (2 g) are mixed and stirred at room temperature for 7 h. The reaction mixture is poured into a mixture of ethanol (150 ml) and potassium acetate (3 g), and the precipitate formed is filtered and dried to give the title compound. Yield: 3.9 g (71%)

Thus obtained product is identified as Compound No. 4 by IR, NMR and mass spectrum. A trimethine- and monomethine-form of the compound No. 4 can easily be obtained by replacing (7) in the scheme with the following (8) and (9), respectively:

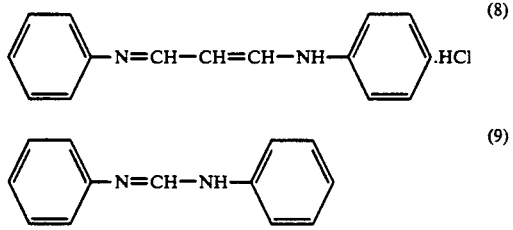

In the photographic materials of the present invention, the oxonole dyes represented by the general formula (I) may be incorporated in light-sensitive silver halide photographic emulsions for use as an anti-irradiation dye, or they may be added in non-light-sensitive hydrophilic colloidal layers for use as a filter dye or an anti-halo dye.

The oxonole dyes (I) of the present invention may be used alone or in combination thereof or with other dyes depending upon the specific of use. The dyes of the present invention can easily be incorporated in light-sensitive silver halide photographic emulsions or other wise hydrophilic colloidal layers by conventional methods. Typically, a dye or an organic or inorganic alkali salt thereof is dissolved in water to form an aqueous dye solution of a suitable concentration, which is then added to a coating solution and applied by known methods to produce a photographic material of the present invention. The content of these dyes varies depending on the specific use but they are usually used to give deposits in the range of 1–800 mg per square meter of the coated photographic material.

Various supports can be used in the photographic material of the present invention including cellulose acetate film, cellulose nitrate film, films of polyesters such as polyethylene terephthalate, films of polyolefins such as polyethylene, polystyrene film, polyamide film, polycarbonate film, baryta paper, polyolefin-coated paper, synthetic polypropylene paper, glass plates, metals and the like. A support is appropriately selected depending on the specific use of the photographic material.

Hydrophilic colloids which can be used in the present invention include: gelatin; gelatin derivatives such as phthalated gelatin and benzenesulfonylated gelatin; water-soluble natural high polymers such as agar, casein and alginic acid; synthetic resins such as polyvinyl alcohol and polyvinyl pyrrolidone; and cellulose derivatives such as carboxymethyl cellulose. These hydrophilic colloids may be used either alone or in combinations thereof.

Any silver halide compounds customarily used in silver halide photographic emulsions, such as silver chloride, silver bromide, silver iodide, silver chlorobromide, silver iodobromide and silver chloroiodobromide, may be employed in silver halide emulsions in the photographic material of the present invention.

The silver halide emulsions used in the photographic material of the present invention can be prepared by various methods such as those described in Examined Japanese Patent Publication No. 7772/1971 or U.S. Pat. No. 2,592,250. The former method relates to a process for preparing "converted-halide" silver halide emulsions and comprises the steps of first forming an emulsion of silver salt grains containing a silver salt having a higher solubility than silver bromide and then converting at least part of these grains to silver bromide or silver iodobromide. The latter method relates to a process for preparing "Lippmann" emulsions comprising fine silver halide grains having an average particle size of no more than 0.1 μm. These silver halide emulsions may be sensitized chemically with various compounds as exemplified below: sulfur sensitizers such as thiosulfates, allyl thiocarbamide, thiourea, allyl isothiocyanate and cystine; active or inert selenium sensitizers; and noble metal sensitizers such as gold compounds (e.g. potassium chloroaurate, auric trichloride, potassium auric thiocyanate and 2-aurothiabenzthiazole methyl chloride), palladium compounds (e.g. ammonium chloropalladate and sodium chloropalladite), platinum compounds (e.g. potassium chloroplatinate), as well as ruthenium compounds, rhodium compounds and iridium compounds. These chemical sensitizers may be used either alone or in combinations. The emulsions may also be sensitized with, for example, reducing agents. If desired, the emulsions may be stabilized with triazoles, imidazoles, azaindenes, benzothiazolium compounds, zinc compounds, cadmium compounds, mercaptans or a mixture thereof. The emulsions may also be sensitized with thioethers, quaternary ammonium salts or polyalkylene oxides.

The photographic emulsions used in the photographic material of the present invention may be spectrally sensitized with sensitizing dyes, if necessary. Various sensitizing dyes including cyanine dyes, merocyanine dyes, complex cyanine dyes, oxonole dyes, hemioxonole dyes, styryl dyes, merostyryl dyes and streptocyanine dyes may be used for this purpose. These sensitizing dyes may be used either alone or in combinations.

The emulsion layers and other hydrophilic colloidal layers in the photographic material of the present invention may also contain wetting agents, plasticizers, film property modifiers, etc., for example, glycerin, dihydroxyalkanes such as 1,5-pentanediol, ethylene bisglycolic acid ester, bis-ethoxydiethylene glycol succinate, and water-dispersible fine particulate high-molecular weight compounds obtained by emulsion polymerization. Other photographic additives which may be contained include: hardeners such as aldehyde compounds, N-methylol compounds (e.g. N,N'-dimethylolurea), mucohalogenic acids, divinyl sulfones, activated halogen compounds (e.g. 2,4-dichloro-6-hydroxy-s-triazine), dioxane derivatives, divinyl ketones, isocyanates and carbodiimides; surfactants such as saponin, polyalkylene glycols, polyalkalene glycol ethers, alkylsulfonates, alkylbenzenesulfonates and alkylnaphthalenesulfonates; as well as optical brightening agents, antistatic agents, antistatin agents, uv absorbers and stabilizers.

The emulsion layers in the photographic material of the present invention may contain color couplers which may be either four- or two-equivalent couplers, or masking colored couplers, or couplers capable of releasing development restrainers. Examples of advantageous yellow-forming couplers are open-chain ketomethylene compounds such as acylacetamides; examples of advantageous magenta-forming couplers are pyrazolone compounds; and examples of advantageous cyan-forming couplers are phenolic or naphtholic compounds.

The following examples are provided for the purpose of further illustrating the present invention but are in no way taken as limiting.

EXAMPLE 1

Gelatin (3.5 g) was dissolved in 35 ml of distilled water. To the resulting solution an aqueous solution (5 ml) containing $2.0 \times 10^{-4}$ mol of a dye of the present invention or a comparative dye as indicated in table 1 was added. Thereafter, 1.25 ml of 10% aqueous saponin solution and 0.75 ml of 1% formalin were added, followed by addition of water to make a total volume of 50 ml. Thus prepared aqueous dye solution was coated onto an acetyl cellulose base dried to yield respective Samples Nos. 1–42 which were then processed with exhausted model solutions in which the dyes listed below had been accumulated.

The comparative dyes are listed below.

Comparative dye A:

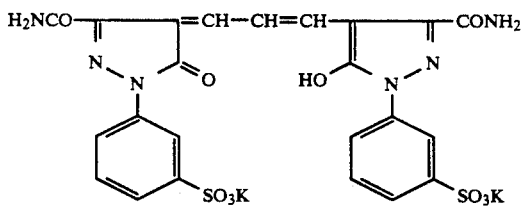

Comparative dye B:

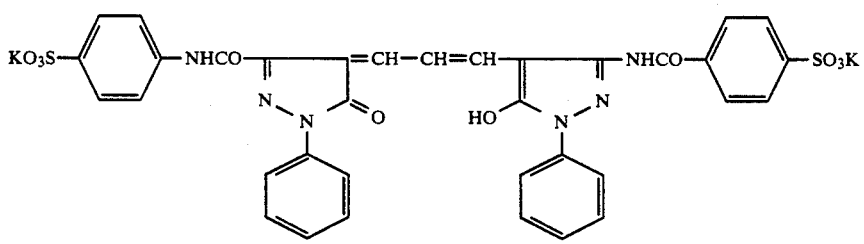

Comparative dye C:

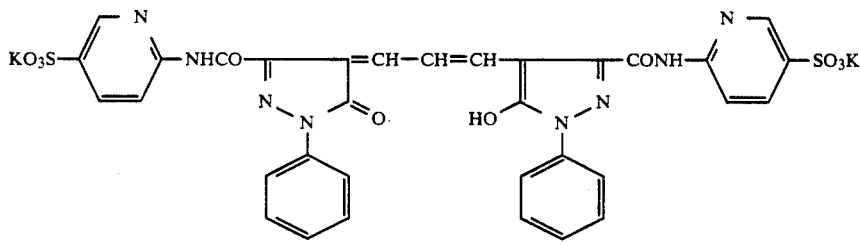

Comparative dye D:

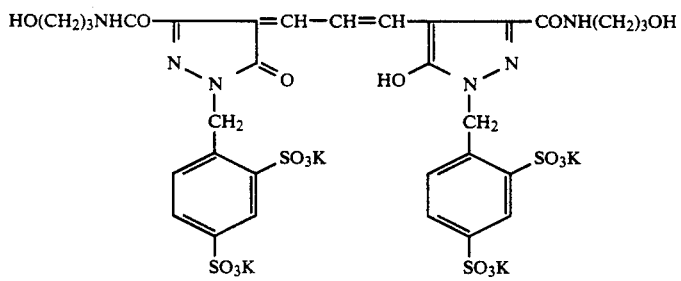

Comparative dye E:

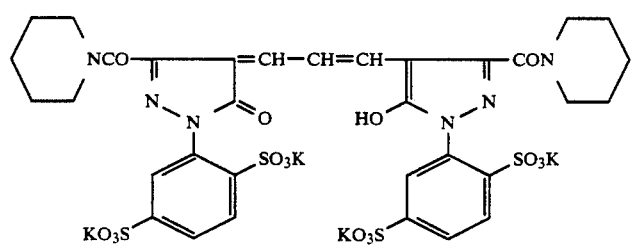

Comparative dye F:

-continued
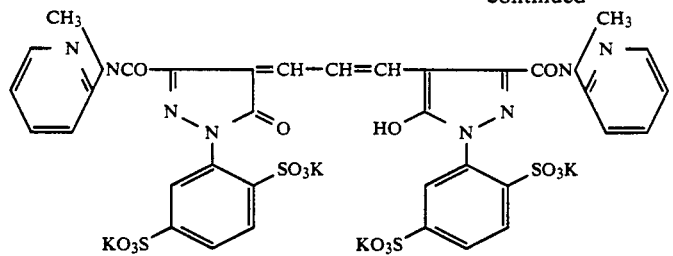
Comparative dye G:
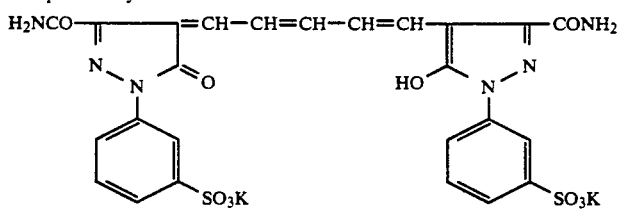
Comparative dye H:
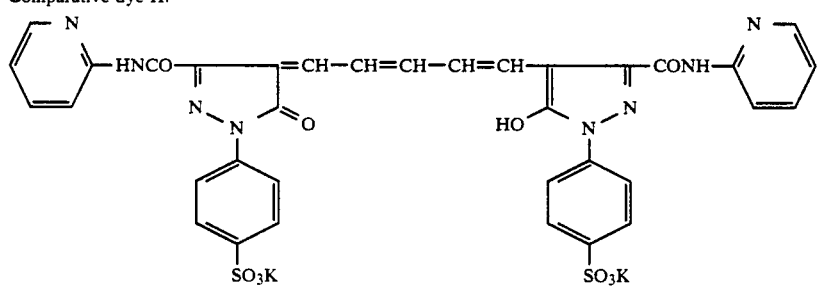
Comparative dye I:
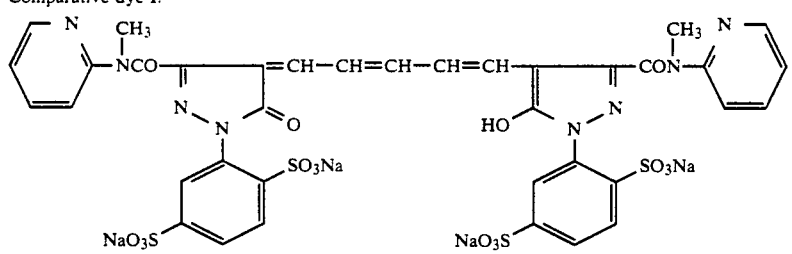
Comparative dye J:
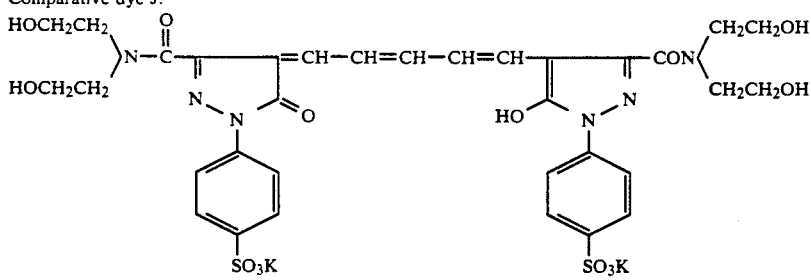
Comparative dye K:
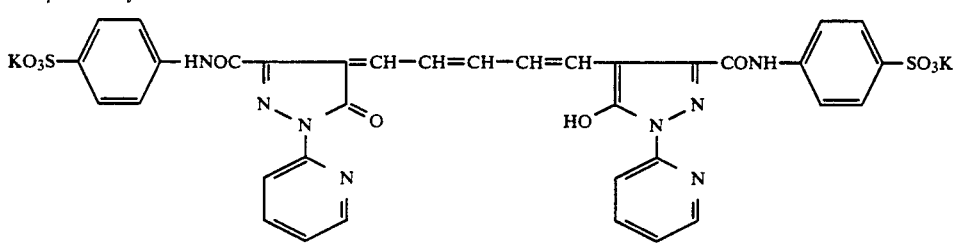

Comparative dye L:

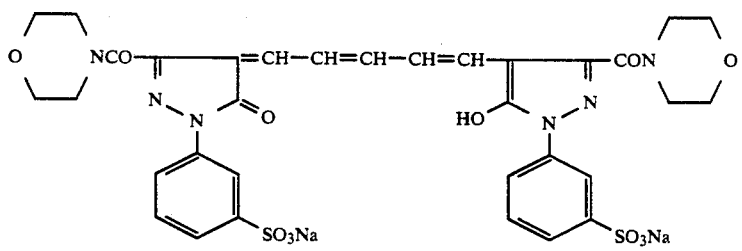

Comparative dye M:

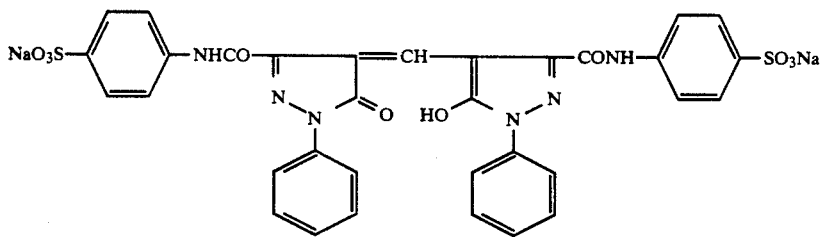

Each sample was immersed for 20 sec, at 30° C. with stirring, in an aqueous sodium hydroxide solution (pH 10.4) in which the same dye compound as in the sample was incorporated at a molar concentration corresponding to 10/molar extinction coefficient. Thereafter, each sample was washed for 15 sec in a water bath containing the same dye at a molar concentration corresponding to 1/molar extinction coefficient, and dried. For each sample, visible spectra were measured before and after the immersion in the dye solution and the percent dissolving-out (DO) was determined from the absorbance at a maximum absorption wavelength according to the following equation:

Percent $DO = (E_1 - E_2)/E_1 \times 100$ (%)

wherein $E_1$ is the absorbance before immersion in the dye-containing aqueous sodium hydroxide solution and $E_2$ is that after the immersion.

Each sample was also immersed in a developing solution of the formulation indicated below at 30° C. for 20 sec, then the sample was washed for 15 sec in a water bath containing the same dye at a molar concentration corresponding to 1/molar extinction coefficient, and subsequently dried. Visible spectra were measured before and after the immersion in the developing solution and the percent decoloring was calculated from the absorbance at a maximum absorption wavelength according to the following equation:

Percent decoloring $= (E_3 - E_4)/E_3 \times 100$ (%)

wherein $E_3$ is the absorbance before immersion in the developing solution and $E_4$ is the absorbance after the immersion.

The results of percent DO and decoloring are shown in Table 1 below.

TABLE 1

| Sample No. | Dye | DO(%) | Decoloring | Remarks |
|---|---|---|---|---|
| I-1 | Comparative dye A | 65 | 70 | Comparison |
| I-2 | Comparative dye B | 40 | 83 | Comparison |
| I-3 | Comparative dye C | 43 | 85 | Comparison |
| I-4 | Comparative dye D | 70 | 73 | Comparison |
| I-5 | Comparative dye E | 73 | 75 | Comparison |

TABLE 1-continued

| Sample No. | Dye | DO(%) | Decoloring | Remarks |
|---|---|---|---|---|
| I-6 | Comparative dye F | 75 | 85 | Comparison |
| I-7 | Comparative dye G | 60 | 75 | Comparison |
| I-8 | Comparative dye H | 50 | 90 | Comparison |
| I-9 | Comparative dye I | 70 | 90 | Comparison |
| I-10 | Comparative dye J | 73 | 78 | Comparison |
| I-11 | Comparative dye K | 52 | 91 | Comparison |
| I-12 | Comparative dye L | 65 | 75 | Comparison |
| I-13 | Comparative dye M | 55 | 59 | Comparison |
| I-14 | Exemplary compound 1 | 91 | 92 | Invention |
| I-15 | Exemplary compound 2 | 92 | 93 | Invention |
| I-16 | Exemplary compound 3 | 92 | 93 | Invention |
| I-17 | Exemplary compound 4 | 93 | 95 | Invention |
| I-18 | Exemplary compound 5 | 93 | 95 | Invention |
| I-19 | Exemplary compound 6 | 94 | 96 | Invention |
| I-20 | Exemplary compound 7 | 90 | 91 | Invention |
| I-21 | Exemplary compound 8 | 94 | 96 | Invention |
| I-22 | Exemplary compound 9 | 91 | 92 | Invention |
| I-23 | Exemplary compound 10 | 91 | 92 | Invention |
| I-24 | Exemplary compound 11 | 94 | 96 | Invention |
| I-25 | Exemplary compound 12 | 93 | 95 | Invention |
| I-26 | Exemplary compound 13 | 94 | 96 | Invention |
| I-27 | Exemplary compound 14 | 94 | 95 | Invention |
| I-28 | Exemplary compound 15 | 93 | 95 | Invention |
| I-29 | Exemplary compound 16 | 94 | 96 | Invention |
| I-30 | Exemplary compound 17 | 93 | 95 | Invention |
| I-31 | Exemplary compound 18 | 91 | 92 | Invention |
| I-32 | Exemplary compound 19 | 90 | 91 | Invention |
| I-33 | Exemplary compound 20 | 90 | 92 | Invention |
| I-34 | Exemplary compound 21 | 93 | 95 | Invention |
| I-35 | Exemplary | 94 | 96 | Invention |

TABLE 1-continued

| Sample No. | Dye | DO(%) | Decoloring | Remarks |
|---|---|---|---|---|
| | compound 22 | | | |
| I - 36 | Exemplary compound 23 | 91 | 92 | Invention |
| I - 37 | Exemplary compound 24 | 91 | 92 | Invention |
| I - 38 | Exemplary compound 25 | 91 | 92 | Invention |
| I - 39 | Exemplary compound 26 | 91 | 92 | Invention |
| I - 40 | Exemplary compound 27 | 92 | 93 | Invention |
| I - 41 | Exemplary compound 28 | 90 | 91 | Invention |
| I - 42 | Exemplary compound 29 | 93 | 96 | Invention |

| Developing solution: | |
|---|---|
| Metol | 3.0 g |
| Sodium sulfite (anhydrous) | 45.0 g |
| Sodium carbonate (monohydrate) | 80.0 g |
| Potassium bromide | 2.0 g |
| Dye (mol. wt.) × (10/molar extinction coefficient) | g |
| Water | to make 1,000 ml |

As is clear form Table 1 above, the samples of the present invention showed much higher or values in both percent DO and decoloring than the comparative samples, demonstrating that exemplary compounds Nos. 1–29 of the present invention more readily dissolved out of the gelatin layer and exhibited better decoloring than the comparative dyes.

EXAMPLE 2

Samples of the color photographic material for print were prepared in accordance with the procedure described below under (1) and, after imagewise exposure, the samples were processed with a color developing solution and a bleach-fixing solution having the formulations indicated hereinafter.

(1) Preparation of samples

Each paper base having the surface coated with polyethylene containing titanium dioxide of anatase type as a white pigment was subjected to a preliminary treatment by subbing with gelatin and, thereafter, the following layers were coated successively to form respective samples.

Layer 1: Blue-sensitive silver chlorobromide emulsion layer

A silver chlorobromide emulsion containing 5 mol % AgCl, and an emulsion prepared by dissolving a yellow coupler (see below under Y-1) and 2,5-di-tert-octyl hydroquinone in dioctyl phthalate and then dispersing in gelatin solution were combined and applied to form a coating.

Layer 2: First intermediate layer

An emulsion prepared from 2,5-di-tert-octyl hydroquinone in dioctyl phthalate was applied to form a coating.

Layer 3: Green-sensitive silver chlorobromide emulsion layer

A silver chlorobromide emulsion containing 15 mol % AgCl, and an emulsion prepared by dissolving a magenta coupler (see below under M-1) and 2,5-di-tert-octyl hydroquinone in dioctyl phthalate and then dispersing in gelatin solution were combined and applied in the presence of an aqueous dye solution as indicated in Table 3 below to form a coating.

Layer 4: Second intermediate layer

An emulsion prepared from an uv absorber (see below under UV-1) and 2,5-di-tert-octyl hydroquinone in dioctyl phthalate was applied to form a coating.

Layer 5: Red-sensitive silver chlorobromide emulsion layer

A silver chlorobromide emulsion containing 25 mol % AgCl, and an emulsion prepared from a cyan coupler (see below under C-1) and 2,5-di-tert-octyl hydroquinone in dioctyl phthalate were combined and applied in the presence of an aqueous dye solution as indicated in Table 4 below to form a coating.

Layer 6: Protective layer

The coating was formed by applying an emulsion containing gelatin, a hardener (H-1) and mold inhibitors (D-1, D-2) as principal components.

The structures of the compounds added to the samples are shown below.

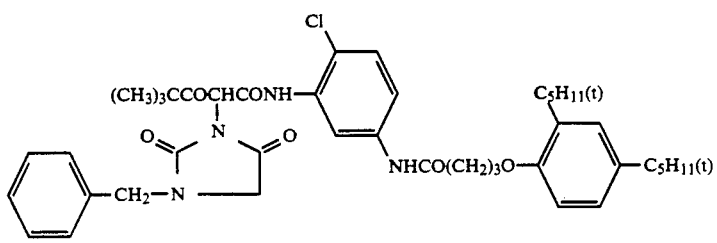

Y-1:

M-2:
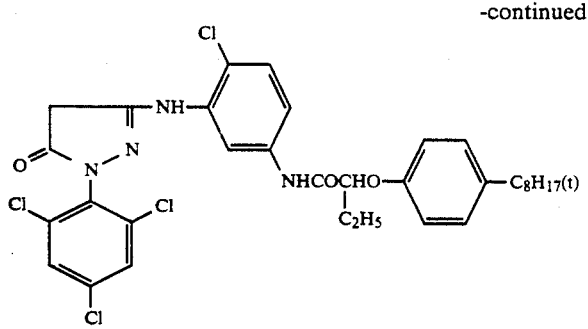

C-1:
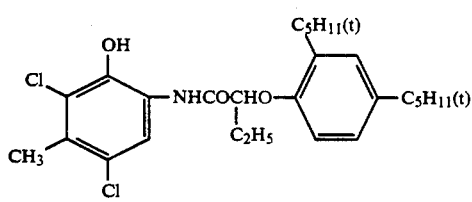

UV-1:
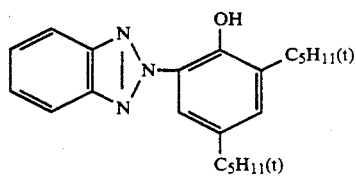

H-1:
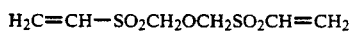
$H_2C=CH-SO_2CH_2OCH_2SO_2CH=CH_2$

D-1:
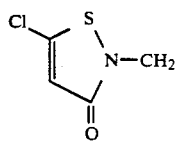

D-2:
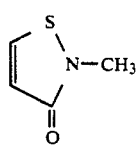

The amounts (in milligrams per 100 m²) of the components in the respective layers are shown in Table 2.

TABLE 2

| Layer No. | Silver halide emulsion | UV absorber or coupler | 2,5-Di-tert-octyl hydroquinone | Gelatin |
|---|---|---|---|---|
| 1 | (Blue-sensitive AgClBr emulsion) 3 mg as silver deposit | (Y - 1) 8 mg | 0.5 mg | 20 mg |
| 2 | (Intermediate layer) | — | 1.0 mg | 10 mg |
| 3 | (Green-sensitive AgClBr emulsion) 4 mg as silver deposit | (M - 1) 5 mg | 0.5 mg | 15 mg |
| 4 | (Intermediate) layer | (UV - 1) 6 mg | 1.0 mg | 10 mg |
| 5 | (Red-sensitive AgClBr emulsion) 3 mg as silver deposit | (C - 1) 4 mg | 0.5 mg | 15 mg |
| 6 | (Protective layer). | — | — | 10 mg |

According to the layer arrangement described above, samples Nos. 2-1 to 2-20 were prepared by changing the dye in the green-sensitive silver chlorobromide emulsion layer, and samples Nos. 3-1 to 3-21 were prepared by changing the dye in the red-sensitive silver chlorobromide emulsion layer. These samples were subjected to evaluation for fogging and color remnant staining in the manner as described below.

TABLE 3

| Sample No. | Dye in green-sensitive AgClBr emulsion layer | Reflection density in unexposed area | | Remarks |
|---|---|---|---|---|
| | | ① fog | ② stain | |
| 2 - 1 | Comparative dye A 0.32 | 0.016 | 0.014 | Comparison |
| 2 - 2 | Comparative dye B 0.32 | 0.020 | 0.018 | Comparison |
| 2 - 3 | Comparative dye C 0.32 | 0.019 | 0.017 | Comparison |

TABLE 3-continued

| Sample No. | Dye in green-sensitive AgClBr emulsion layer | Reflection density in unexposed area ① fog | ② stain | Remarks |
|---|---|---|---|---|
| 2 - 4 | Comparative dye D 0.32 | 0.015 | 0.013 | Comparison |
| 2 - 5 | Comparative dye E 0.32 | 0.013 | 0.011 | Comparison |
| 2 - 6 | Comparative dye F 0.32 | 0.014 | 0.012 | Comparison |
| 2 - 7 | — | 0.002 | 0 | Comparison |
| 2 - 8 | Exemplary compound 1 0.32 | 0.005 | 0.004 | Invention |
| 2 - 9 | Exemplary compound 4 0.32 | 0.004 | 0.003 | Invention |
| 2 - 10 | Exemplary compound 5 0.32 | 0.004 | 0.003 | Invention |
| 2 - 11 | Exemplary compound 9 0.32 | 0.005 | 0.004 | Invention |
| 2 - 12 | Exemplary compound 12 0.32 | 0.004 | 0.003 | Invention |
| 2 - 13 | Exemplary compound 15 0.32 | 0.004 | 0.003 | Invention |
| 2 - 14 | Exemplary compound 17 0.32 | 0.004 | 0.003 | Invention |
| 2 - 15 | Exemplary compound 19 0.32 | 0.005 | 0.004 | Invention |
| 2 - 16 | Exemplary compound 20 0.32 | 0.005 | 0.004 | Invention |
| 2 - 17 | Exemplary compound 21 0.32 | 0.004 | 0.003 | Invention |
| 2 - 18 | Exemplary compound 24 0.32 | 0.005 | 0.004 | Invention |
| 2 - 19 | Exemplary compound 25 0.32 | 0.005 | 0.004 | Invention |
| 2 - 20 | Exemplary compound 26 0.32 | 0.005 | 0.004 | Invention |

TABLE 4

| Sample No. | Dye in red-sensitive AgClBr emulsion layer | Reflection density in unexposed area ① fog | ② stain | Remarks |
|---|---|---|---|---|
| 3 - 1 | Comparative dye G 0.32 | 0.016 | 0.013 | Comparison |
| 3 - 2 | Comparative dye H 0.32 | 0.020 | 0.017 | Comparison |
| 3 - 3 | Comparative dye I 0.32 | 0.018 | 0.015 | Comparison |
| 3 - 4 | Comparative dye J 0.32 | 0.016 | 0.012 | Comparison |
| 3 - 5 | Comparative dye K 0.32 | 0.019 | 0.016 | Comparison |
| 3 - 6 | Comparative dye L 0.32 | 0.018 | 0.016 | Comparison |
| 3 - 7 | — | 0.002 | — | Comparison |
| 3 - 8 | Exemplary Compound 2 0.32 | 0.005 | 0.004 | Invention |
| 3 - 9 | Exemplary Compound 6 0.32 | 0.004 | 0.003 | Invention |
| 3 - 10 | Exemplary Compound 8 0.32 | 0.004 | 0.003 | Invention |
| 3 - 11 | Exemplary Compound 10 0.32 | 0.004 | 0.003 | Invention |
| 3 - 12 | Exemplary Compound 11 0.32 | 0.004 | 0.003 | Invention |
| 3 - 13 | Exemplary Compound 13 0.32 | 0.004 | 0.003 | Invention |
| 3 - 14 | Exemplary Compound 14 0.32 | 0.004 | 0.003 | Invention |
| 3 - 15 | Exemplary Compound 16 0.32 | 0.004 | 0.003 | Invention |
| 3 - 16 | Exemplary Compound 18 0.32 | 0.005 | 0.004 | Invention |
| 3 - 17 | Exemplary Compound 22 0.32 | 0.004 | 0.003 | Invention |
| 3 - 18 | Exemplary Compound 23 0.32 | 0.005 | 0.004 | Invention |
| 3 - 19 | Exemplary Compound 27 0.32 | 0.005 | 0.004 | Invention |
| 3 - 20 | Exemplary Compound 29 0.32 | 0.005 | 0.004 | Invention |
| 3 - 21 | Exemplary Compound 29 0.32 | 0.005 | 0.003 | Invention |

Each numeral following the names of dyes in Tables 3 and 4 represents the coated weight (mg) per 100 cm$^2$.

(1) Fogging

An unexposed sample was processed according to the scheme shown below and the magenta and cyan densities of the processed sample were measured with a Gretag D-122 densitometer.

| Processing scheme (38° C.) | |
|---|---|
| Color development | 2 min and 30 sec |
| Bleaching | 1 min |
| Washing with water | 1 min |
| Drying | 2 min (60–80° C.) |

| Color developing solution | |
|---|---|
| Pure water | 800 ml |
| Benzyl alcohol | 15 ml |
| Triethanolamine | 10 g |
| Hydroxylamine sulfate | 2.0 g |
| Potassium bromide | 1.5 g |
| Sodium chloride | 1.0 g |
| Potassium sulfite | 2.0 g |
| N-Ethyl-N-β-methanesulfonamidoethyl-3-methyl-4-aminoaniline sulfate | 4.5 g |
| 1-Hydroxyethylidene-1,1-diphosphonic acid (60% aq. soln.) | 1.5 ml |
| Potassium carbonate | 32 g |
| Whitex BB (50% aq. soln.) (optical brightening agent of Sumitomo Chemical Co., Ltd.) | 2 ml |
| Pure water | to make 1,000 ml | pH adjusted to 10.1 with 20% sodium hydroxide or 10% dilute sulfuric acid

| Bleach-fixing solution | |
|---|---|
| Pure water | 600 ml |
| Ethylenediaminetetraacetic acid iron (III) ammonium salt | 65 g |
| Ammonium thiosulfate | 85 g |
| Sodium hydrogensulfite | 10 g |
| Sodium metabisulfite | 2 g |
| Sodium dromide | 10 g |
| Pure water | to make 1,000 ml | pH adjusted to 7.0 with dilute sulfuric acid (2) Color remnant staining

In order to determine the degree of color staining due to the color remnant of a dye in the sample after photographic processing, a solution was prepared which did not contain N-ethyl-N-β-methanesulfonamidoethyl-3-methyl-4-aminoaniline sulfate used in the color developing solution for photographic processing in (1) and the same test was conducted as in (1). The results of (1) and (2) are shown in Tables 3 and 4 above.

For practically applicable whiteness for color photographic materials for print, a fog must not exceed 0.005. It is clear from Tables 3 and 4 that this requirement is fulfilled in the samples of the present invention. The samples containing a comparative dye suffered from staining due to the color remnant of the dye, while this problem was substantially absent in the samples of the present invention. It is therefore evident that the dyes falling within the scope of the present invention cause substantially no adverse effects on the photographic emulsions.

As will be understood from the foregoing description, the present invention provides a silver halide photographic material containing a water-soluble dye which is photographically inert in said photographic material and readily decolored and/or dissolved out during photographic processing, resulting in only substantially negligible staining after processing.

What is claimed is:

1. A silver halide photographic material which comprises a compound of the general formula (I):

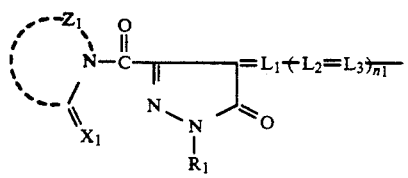

(I)

-continued

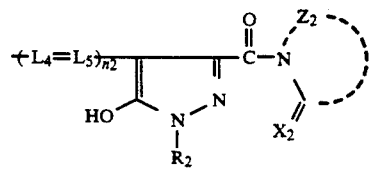

wherein $R_1$ and $R_2$ each represents a hydrogen atom, an alkyl group, an aryl group, an alkenyl group or a heterocyclic group; $Z_1$ and $Z_2$ each represents a non-metallic atomic group necessary for forming a 5- to 7-membered ring; $X_1$ and $X_2$ each represents an oxygen atom, a sulfur atom or $=$N-$R_3$; $R_3$ is a hydrogen atom, an alkyl group, an aryl group, an alkenyl group, a heterocyclic group or —O$R_4$; $R_4$ represents a hydrogen atom, an alkyl group, an aryl group, an alkenyl group or a heterocyclic group; $L_1$ to $L_5$ each represents a methine group; and $n_1$ and $n_2$ each represents an integer of 0, 1 or 2.

2. A photographic material as claimed in claim 1 wherein $R_1$ and $R_2$ each represents an alkyl group or a substituted phenyl, said 5- to 7-membered ring containing $Z_1$ or $Z_2$ is selected from the group consisting of pyrimidine, pyrrolidine, piperidine, morpholine, thiazole, pyrazole, and thiazoline, and $X_1$ and $X_2$ each represents an oxygen atom.

3. A photographic material as claimed in claim 2 wherein $R_1$ and $R_2$ each represents a substituted phenyl.

* * * * *